Jan. 28, 1958 A. B. WALTON 2,821,163
MACHINE FOR APPLYING GRANULES TO THE
SURFACE OF ROOFING MATERIAL
Filed April 13, 1956 4 Sheets-Sheet 1

Inventor:
Alfred B. Walton
By Gary, Desmond & Parker
Attys.

Inventor:
Alfred B. Walton
By Gary, Desmond & Parker
Attys.

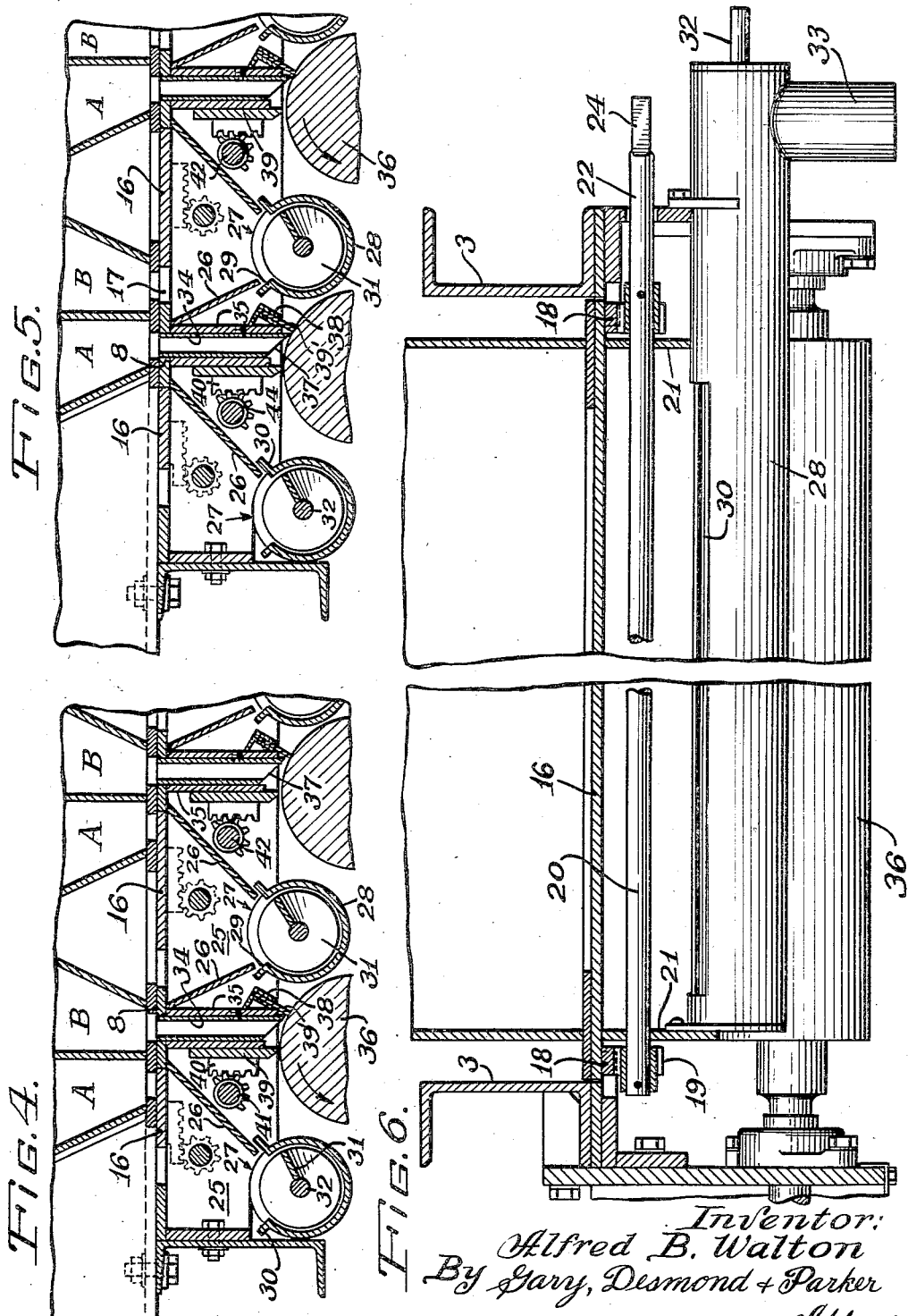

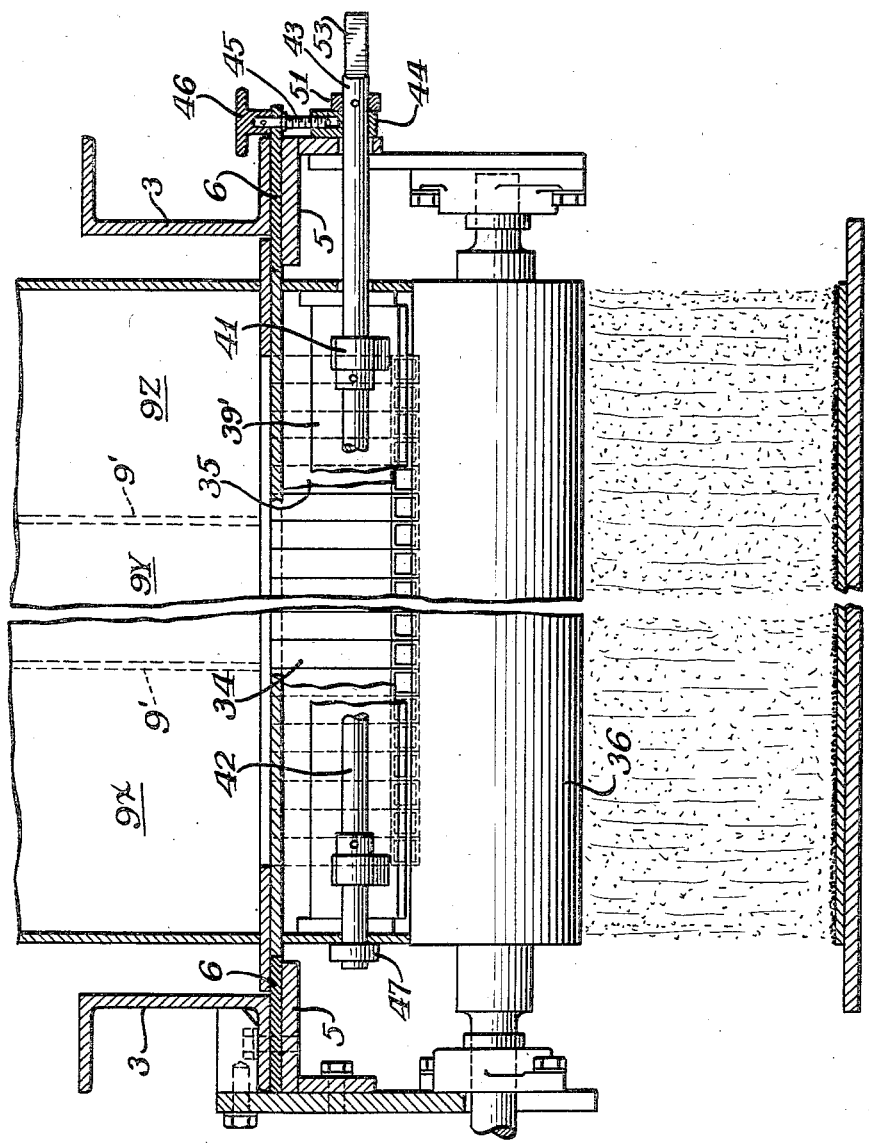

United States Patent Office 2,821,163
Patented Jan. 28, 1958

2,821,163

MACHINE FOR APPLYING GRANULES TO THE SURFACE OF ROOFING MATERIAL

Alfred B. Walton, Chicago, Ill., assignor to Roofing Machinery Mfg. Company, Chicago, Ill., a corporation of Illinois Application April 13, 1956, Serial No. 578,053

8 Claims. (Cl. 118—310)

This invention relates to improvements in a machine for making roofing material and relates particularly to a machine for applying colored granules, or granules having different characteristics, to different portions of an adhesive coated, continuously passing web or sheet of roofing material.

In the making of the usual asphalt shingles or the like it has been the practice to apply to the weather surface of the shingle slate granules of different colors in order to take advantage of the utilitarian effect of the slate granules and the pleasing and artistic effect of a multicolored roof.

In the production of roofing material of the class described, difficulties have been encountered in shifting or changing from one combination of colors for one run to another different combination of colors for a succeeding run. In other words, the change-over from one run to another run frequently consumes considerable waste time particularly with machines presently available for performing the granule-applying operation. The time wasted includes the time to clean out the unused granules of a previous run; loading the hoppers with the new combination of colored granules and resetting the machine for the new operations.

The present invention contemplates a machine for applying a plurality of multicolored granules to a passing roofing sheet, which is so contrived that a change-over to a different combination of colored granules can be accomplished almost instantaneously, means being contemplated for disposing of the unused granules of the previous run in segregated fashion while the change-over is being effected and means being provided for reloading the machine with a new combination of granules for a succeeding run without interruption of the run then in progress.

Other objects and advantages will be apparent from the accompanying drawings and following detailed description.

In the drawings,

Fig. 4 is an enlarged fragmentary sectional view of the machine showing the relationship of one set of hoppers to the granule-applying rolls.

Fig. 5 is a similar view showing the relationship of the remaining set of hoppers to the granule-applying rolls.

Fig. 6 is an enlarged transverse sectional view taken on line 6—6 of Fig. 3.

Fig. 7 is a transverse sectional view taken on line 7—7 of Fig. 3.

Figure 1:
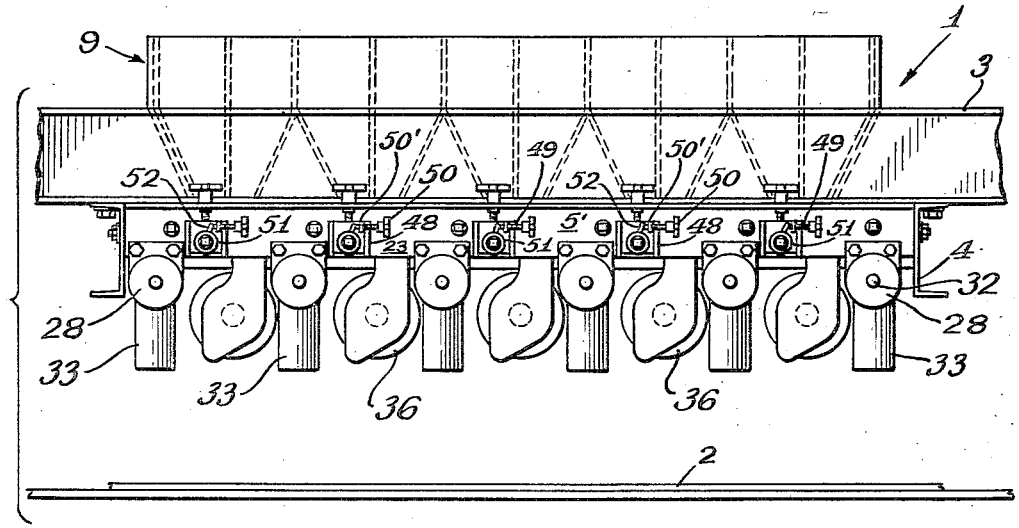
Fig. 1 is a side elevational view of that portion of a roofing shingle making machine for applying combinations of colored granules to a continuously passing sheet of roofing material, the portion illustrated embodying the concepts of the present invention.

Referring in detail to the drawings, 1 indicates generally that portion of a roofing shingle making machine which applies granules to a continuously passing sheet or web 2 of roofing material. In the portion of the machine (not shown) which precedes the section 1 a web of roofing material is passed through a bath of saturant, usually a low melting point asphalt, wherein the body of the web is impregnated with the asphalt. Subsequently, a higher melting point coating asphalt is applied to the upper surface of the web 2 and while the coating is still wet or in tacky condition it is passed beneath the section 1, illustrated.

The section 1 comprises spaced longitudinal frame members 3 and spaced transverse frame members 4 which are adapted to carry the granule-applying mechanism which characterizes the present invention. Secured to the bottom flange of each beam or longitudinal frame member 3 is an elongated supporting plate 5 which extends the length of the section 1. A platform 6 is carried at each side by one of the supporting plates 5 and the side edges of each platform are interposed between a respective supporting plate and the bottom flange of an adjacent beam 3, as viewed best in Figs. 6 and 7. The platform 6 is provided with a plurality of spaced apertures 7 which are relatively enlarged and extend transversely across the machine. Between each pair of relatively enlarged apertures 7 are a plurality of aligned square or rectangular apertures 8, the apertures 8 being in an alignment which extends transversely of the machine, that is, parallel to the longitudinal axes of the apertures 7.

A hopper structure 9 is positioned above, and in slidable relationship to, the platform 6, said structure comprising a base plate 10 upon which a plurality of hopper partition walls 11, 12 and 13 are carried. A plurality of hopper spaces A are provided between each pair of walls 11 and 12 and a plurality of hopper spaces B are provided between each pair of walls 12 and 13. Hereinafter, for purposes of description the hopper spaces A will be referred to as the "A hoppers," and the hopper spaces B will be referred to as the "B hoppers." The base plate 10 is provided with a plurality of pairs of spaced transverse apertures 14 and 15 which provide discharge openings at the bottoms of A hoppers and B hoppers, respectively.

In each of the apertures 7 provided in the platform 6 a slidable valve plate 16 is carried, the plates 16 being movable within the respective apertures 7 in a direction longitudinally of the machine. Each plate 16 is of lesser transverse dimension or width than the width of the aperture 7 in which it moves whereby a slot 17 is provided between an edge of each valve plate 16 and an edge defining each aperture 7.

Each valve plate 16 carries a pair of spaced racks 18 (Figs. 3, 4, 5 and 6) which are in engagement, respectively, with a pair of pinions 19 carried upon a transversely disposed shaft 20, each of said shafts being journaled in downwardly extending walls 21 which are carried by platform 6, each of said shafts being disposed beneath an aperture 7 provided in said platform. Each shaft 20 has a portion 22 which extends, on one side of the machine, through a wall 5' secured to plate 5, the extended end portion of each shaft being of square section, as shown best at 24 in Fig. 6, whereby said shaft may be rotated by the application of a suitable wrench (not shown). Thus, by the rotation of shafts 20 the valve plates 16 may be moved within the apertures 7.

Beneath each aperture 7 a subhopper 25 is provided, said subhoppers being defined by the side walls 21 and inclined transverse walls 26. At the bottom of each subhopper 25 a discharge opening 27 is provided. A conduit 28 is positioned beneath each opening 27, each conduit being provided with an elongated axial opening 29 longitudinally defined by radially extending lips 30. A screw conveyor 31, carried upon a shaft 32, is positioned within each conduit 28 and is rotated by any suitable driving means (not shown).

Figure 2:
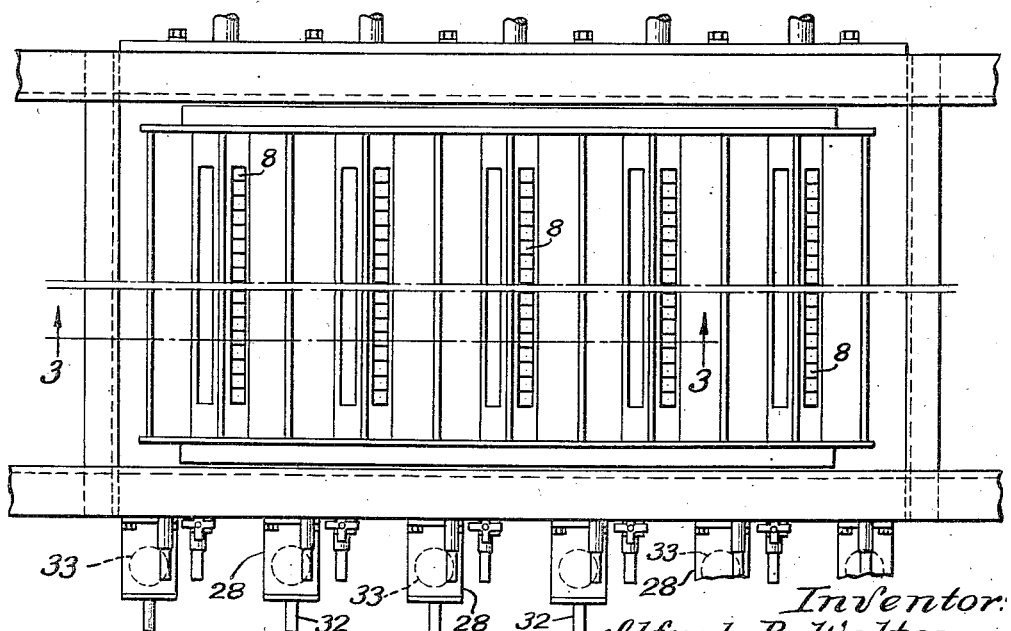
Fig. 2 is a top plan view of the portion of the machine illustrated in Fig. 1.
Figure 3:
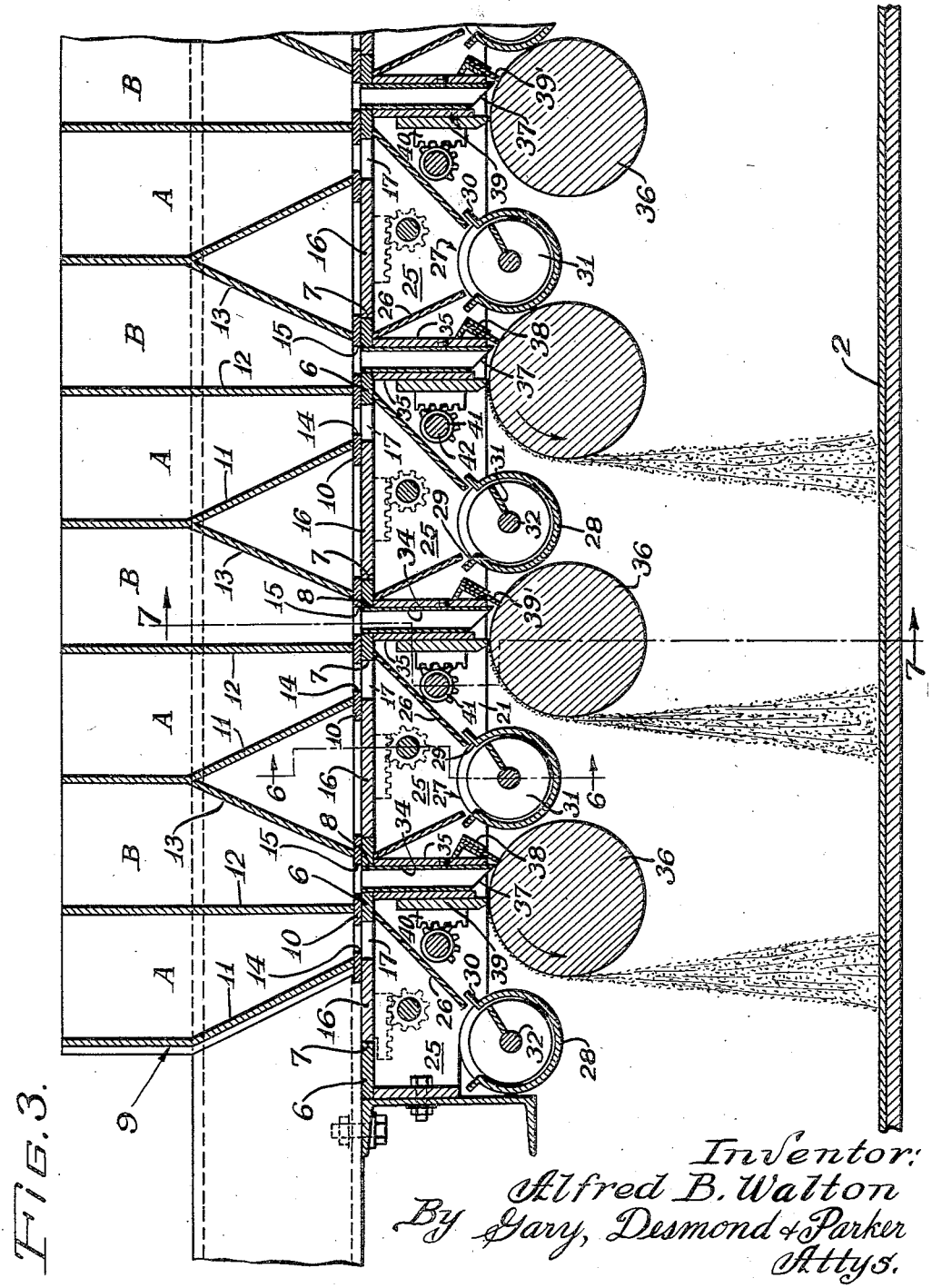
Fig. 3 is an enlarged sectional view of the machine taken on line 3—3 of Fig. 2.

The arrangement is such that granules which may be contained in any of the A or B hoppers may be discharged to the subhoppers 25 when the openings 17 are brought into registration with either the openings 14 of the A hoppers or the openings 15 of the B hoppers. The granules thus discharged to the subhoppers may be discharged therefrom into the respective conduits 28 and may be conveyed by screws 31 to discharge spouts 33 which connect into the ends of the conduits 28, as shown best in Figs. 2 and 6. The spouts 33 may discharge to any suitable containers (not shown), separate containers preferably being employed for each spout whereby predetermined discharged granules may be maintained separate from each other.

A square or rectangular sectioned pipe 34 may be connected into each aperture 8, the pipes of each aligned group being laterally confined by spaced plates 35 (Figs. 3, 4, 5 and 7). An applicator roll 36 is positioned beneath each pipe 34, said pipes being open at their lower ends and their respective mouths being defined by tapered edges, as shown best at 37 in Figs. 3, 4 and 5. Thus, granules which may pass downwardly through pipes 34 from the A or B hoppers may be discharged onto the upper surfaces of the rolls 36.

Upon one plate 35 of each pair of plates which laterally confine pipes 34 a dam 38 is carried, each dam carying a finger 39' constructed preferably of flexible resilient material and the edge of which rides upon a respective roll 36 to prevent rearward flow of granules which may be discharged to the roll surface from pipes 34.

Upon the opposite plate 35 of each pair of plates a gate 39 is positioned for vertical slidable movement. A rack 40 is mounted upon each gate 39 and each rack is in engagement with a segmental pinion 41 mounted upon an operating shaft 42. An end portion 43 of each shaft extends through plate 5' and is carried by a vertically movable bearing block 44. The block 44 is internally threaded to receive the threaded shank of a threaded adjusting screw 45 to which a hand wheel 46 is secured, the shank of the screw being loosely positioned in platform 6. The opposite end of each shaft 42 is journaled in bearing 47, the arrangement being such that by the manipulation of hand wheel 46 its respective shaft 42 may be raised or lowered at one end thereof. The mounting of each bearing 47 is such as to permit slight canting of the shaft 42 carried thereby. Thus, the lower edge of each gate 39 may be brought into parallel alignment with a respective roll surface.

Spaced guides 48 are mounted upon plate 5' adjacent each shaft 42 and function as guides for the vertical movement of blocks 44 when screws 45 are manipulated. A set screw 49 carrying a knob 50 is threadedly positioned in a lug 50' which is mounted upon each block 44. A collar 51 is secured to the end portion 43 of each shaft 42 and each collar carries a radially extending stop lug 52 which is adapted to abut against the end of an adjacent set screw 49. The end of each shaft is formed of square section, as shown best at 53 in Fig. 7, whereby each shaft may be rotated by a suitable wrench (not shown) which may be applied to the squared end 53.

It will be noted that the rotation of a shaft 42 raises or lowers the gate 39 movably secured to the shaft through a respective rack 40 and segmental pinion 41. Thus the lower edges of a respective gate may be raised or lowered with respect to the surface of a roll 36. Hence, when a roll 36 rotates, the amount of granules carried past the gate upon the surface of the roll may be controlled. By means of set screws 49 the position of each gate 39 may be fixed. This permits retraction of the lower edge of each gate with respect to each roll surface while not disturbing a predetermined fixed adjustment of the gate, that is, without requiring repeated adjustments of the gate position the gate may be moved when desired and can be automatically brought back to said fixed adjusted position as determined by set screws 49.

The operation of the present invention is as follows: For purposes of example it is assumed that the shingles constructed from web 2 will have applied to the upper surface thereof a plurality of different granules. That is, the granules may differ in their coloring or other characteristics. It is further assumed that the combination of granules is contained in the B hoppers. Although four A hoppers and four B hoppers are shown in the drawings, it is to be understood that two or more A and B hoppers may be employed depending upon the granule combinations adapted to be handled by the machine.

Employing the B hoppers, the discharge openings 15 of the B hoppers will be in communication with the respective pipes 34, that is, the B hoppers will be disposed immediately above the pipes 34. At this period of operation, valve plates 16 may either be so positioned as to permit communication between the A hoppers and the subhoppers, or will be in a position to close said latter communication.

The applicator rolls 36 are preferably separately driven either directly or through a plurality of controllable clutches (not shown). Hence, as each roll 36 is driven the granules from the B hopper immediately above said driven roll will be deposited upon the web 2. This operation is continued as long as shingles comprising the combination of granules in the B hoppers is desired, that is, as long as one run of shingles is desired. Of course, if the run is so great as to deplete the supply of granules in the B hoppers, or any one of them, said hoppers may be replenished while the run is in progress.

However, when the run is completed and it is desired to initiate a succeeding run comprising a different combination of granules (the assumption being made that the A hoppers are loaded with the granules comprising the combination of the succeeding run), the hopper structure 9 may be bodily moved over the platform 6 so as to position the A hoppers above the rolls 36, that is, with the openings 14 in communication with the pipes 34. Thus, without stopping the machine the A hoppers may be brought into operation to produce the granule combination required by the new run.

When the hopper structure has been moved, as mentioned hereinbefore, the B hoppers may or may not still carry granules employed in the previous run. In practice, in substantially all instances granules will be carried in the B hoppers. Hence, the valve plates will have been moved previous to the shifting of the hopper structure 9 to bring the openings 17 into a communicating position with the B hoppers as shown best in Fig. 5, whereupon the granules in the respective B hoppers will be discharged into a subhopper 25. These residual granules may then be carried through the respective conduits 28 to the spouts 33 wherefrom the respective granules may be discharged to separate containers.

After the residual granules have been discharged from the respective B hoppers and separately collected, the valve plates 16 may be shifted to close communication between the B hoppers and the subhoppers 25, and the B hoppers may then be charged with another combination of granules in anticipation of another succeeding run.

When the second run is completed, the hopper structure 9 may again be shifted in the opposite direction to again bring the B hoppers into operation, and the discharging and replenishing of the A hoppers may then be carried out. In Fig. 4 the B hoppers are shown in active operation and the plates 16 have so been shifted as to permit the loading of the A hoppers. Of course, the cycle of operations hereinbefore described may be repeated, as desired.

As another important feature of the invention, it is frequently desirable, in applying granules to a passing web of roofing material, to apply granules of different characteristics to different longitudinal areas of the passing web or to apply granules to some longitudinal areas and not to others. To accomplish this operation it is merely necessary to insert removable partitions 9' (Fig. 7), in each or any desired A or B hopper. Thus the hopper space may be divided into separate compartments 9X, 9Y and 9Z. Of course, one or more partitions may be used, that is, the hoppers may be divided into any number of compartments desired.

By filling the hopper compartments 9X, 9Y and 9Z with different granules or by filling some hopper compartments and leaving others empty, clearly demarked longitudinal areas upon the web may have predetermined or no granules applied thereto. The demarking of said longitudinal areas is accomplished by means of the tubes 34, that is, by the provision of the plurality of adjacent tubes, the granules will not intermingle in the zones between the flow openings of the hoppers and the applicator rolls. It appears that each tube discharges its quantity of granules to a specific portion of the surface of the applicator roll and inasmuch as the mouths of the tubes are adjacent the roll surface negligible marginal intermingling of the granules takes place on the applicator roll and on the web.

It will be noted that a relatively large number of tubes 34 are employed and that said tubes are close together and of substantially square or rectangular section. By this arrangement partitions 9' may be positioned at any of a large number of locations along the lengths of the hoppers. The partitions may be removably positioned in the hoppers in any suitable manner, preferably so that the plane of each partition is in alignment with lateral abutting sides of any desired pair of adjacent tubes. Of course, the machine may be operated without employing any of the partitions, the tubes or pipes 34 not interfering with the substantially uniform disposition of the granules on the applicator roll or web.

Thus, the machine comprising the present invention is capable and adapted to perform the following sequence of operations without stopping the movement of the web or shutting down the machine: (1) It contemplates depositing a plurality of granules of different characteristics in a predetermined combination on a moving web, while; (a) discharging residual granules of the previous run in segregated relationship to storage, and while, (b) replenishing the hoppers with a new combination of granules, the operations (a) and (b) all being performed without interruption of a run then in progress.

If desired, suitable rack and pinion means (not shown) may be employed to shift the hopper structure 9 back and forth, and further, if desired all the shafts 20 may be suitably geared together to move in unitary fashion. Likewise all of the shafts 42 may be geared together by conventional gearing to raise or lower the gates 39 in a unitary fashion, if desired. These and other modifications and mechanical expedients may suggest themselves to anyone skilled in the art and, hence, I do not wish to be limited to the precise details shown and described except as necessitated by the appended claims.

I claim as my invention:

1. A machine for depositing a plurality of masses of granules upon a passing web of roofing material, each mass comprising granules of different characteristics than those of another mass, which comprises, a platform having a plurality of adjacent discharge openings and applicator openings alternately disposed, a hopper structure positioned upon said platform, said hopper structure comprising a plurality of pairs of hoppers for carrying granules of different characteristics, each hopper being provided with a flow opening, said hopper structure being movable upon said platform to bring alternately the flow openings of a pair of hoppers into respective communication with an applicator opening and a discharge opening, a valve plate movably carried by said platform adjacent each discharge opening for opening and closing communication between an adjacent discharge opening and an adjacent flow opening, applicator means disposed beneath each applicator opening for applying granules from a flow opening to a passing web, and discharge means beneath each discharge opening for receiving granules from a companion flow opening when said valve plate permits communication between a flow opening and a discharge opening.

2. A machine for depositing a plurality of masses of granules upon a passing web of roofing material, each mass comprising granules of different characteristics than those of another mass, which comprises, a platform having a plurality of adjacent discharge openings and applicator openings alternately disposed, a hopper structure positioned upon said platform, said hopper structure comprising a plurality of pairs of hoppers for carrying granules of different characteristics, each hopper being provided with a flow opening, said hopper structure being movable upon said platform to bring alternately the flow openings of a pair of hoppers into respective communication with an applicator opening and an adjacent discharge opening, a valve plate movably carried by said platform adjacent each discharge opening for opening and closing communication between a discharge opening and an adjacent flow opening, applicator means disposed beneath each applicator opening for applying granules from an operating flow opening to a passing web, and discharge means beneath each discharge opening for receiving granules from the flow opening adjacent said operating flow opening when said valve plate permits communication between a flow opening and a discharge opening.

3. A machine for depositing a plurality of masses of granules upon a passing web of roofing material, each mass comprising granules of different characteristics than those of another mass, which comprises, a platform having a plurality of adjacent alternately disposed discharge openings and applicator openings, a hopper structure positioned upon said platform, said hopper structure comprising a plurality of pairs of hoppers for carrying granules of different characteristics, each hopper being provided with a flow opening, said hopper structure being movable upon said platform to bring alternately the flow openings of a pair of hoppers into respective communication with an applicator opening and a discharge opening, a valve plate movably carried by said platform adjacent each discharge opening for opening and closing communication between an adjacent discharge opening and an adjacent flow opening, roll applicator means disposed beneath each applicator opening for applying granules from a flow opening to a passing web, and a sub-hopper positioned beneath each discharge opening for receiving granules from a companion flow opening when said valve plate permits communication between a flow opening and a discharge opening.

4. A machine for depositing a plurality of masses of granules upon a passing web of roofing material, each mass comprising granules of different characteristics than those of another mass, which comprises, a platform having a plurality of adjacent alternately disposed discharge openings and applicator openings, a hopper structure positioned upon said platform, said hopper structure comprising a plurality of pairs of hoppers for carrying granules of different characteristics, each hopper being provided with a flow opening, said hopper structure being movable upon said platform to bring alternately the flow openings of a pair of hoppers into respective communication with an applicator opening and a discharge opening, a valve plate carried by said platform and slidably positioned in each discharge opening for opening and closing communication between said discharge opening and a respective adjacent flow opening, applicator means disposed beneath each applicator opening for applying granules from a flow opening to a passing web, and discharge means beneath each discharge opening for receiving granules from a companion flow opening when said valve plate permits communication between a flow opening and a discharge opening.

5. A machine for depositing a plurality of masses of granules upon a passing web of roofing material, each mass comprising granules of different characteristics than those of another mass, which comprises, a platform having a plurality of adjacent alternately disposed discharge openings and applicator openings, a hopper structure positioned upon said platform, said hopper structure comprising a plurality of pairs of hoppers for carrying granules of different characteristics, each hopper being provided with a flow opening, said hopper structure being movable upon said platform to bring alternately the flow openings of a pair of hoppers into respective communication with an applicator opening and a discharge opening, a valve plate carried by said platform and slidably positioned in each discharge opening for opening and closing communication between said discharge opening and a respective adjacent flow opening, applicator means disposed beneath each applicator opening for applying granules from a flow opening to a passing web, and discharge means beneath each discharge opening for receiving granules from a companion flow opening when said valve plate permits communication between a flow opening and a discharge opening, said discharge means comprising a subhopper disposed beneath each discharge opening, and a conveyor disposed in each subhopper for removing the granules from said subhopper.

6. A machine for depositing a plurality of masses of granules upon a passing web of roofing material, each mass comprising granules of different characteristics than those of another mass, said machine comprising, a platform having a plurality of adjacent alternately disposed discharge openings and applicator openings, a hopper structure positioned upon said platform, said hopper structure comprising a plurality of pairs of hoppers for carrying granules of different characteristics, each hopper being provided with a flow opening, said hopper structure being movable upon said platform in alternate directions to bring alternately the flow openings of a pair of hoppers into respective communication with an applicator opening and a discharge opening, a valve plate movably carried by said platform adjacent each discharge opening for opening and closing communication between an adjacent discharge opening and an adjacent flow opening, roll applicator means disposed beneath each applicator opening for transferring ganules from a flow opening to a passing web, gate means carried beneath said platform and above said roll applicator, means for controlling the flow of granules over said applicator means, and discharge means beneath each discharge opening for receiving granules from a companion flow opening when said valve plate permits communication between a flow opening and a discharge opening.

7. A machine for depositing a plurality of masses of granules upon a passing web of roofing material, each mass comprising granules of different characteristics than those of another mass, which comprises, a platform having an applicator opening and a discharge opening disposed on each side of said applicator opening, a hopper structure positioned upon said platform, said hopper structure comprising a pair of hoppers for carrying granules of different characteristics, each hopper being provided with a flow opening, said hopper structure being movable upon said platform to bring alternately the flow openings of said pair of hoppers into respective communication with an applicator opening and a discharge opening, a valve plate slidably positioned in each discharge opening for opening and closing communication between an adjacent discharge opening and an adjacent flow opening, means for sliding such valve plate to opened and closed position, applicator means disposed beneath said applicator opening for applying granules from a flow opening to a passing web, and discharge means beneath each discharge opening for receiving granules from a companion flow opening when said valve plate permits communication between a flow opening and a discharge opening.

8. A machine for depositing a plurality of masses of granules upon a passing web of roofing material, each mass comprising granules of different characteristics than those of another mass, said machine comprising, a platform, a plurality of rectangular sectioned vertically disposed applicator pipes disposed with their lateral walls in abutting relationship and with their axes in transverse alignment across said machine, said platform also being provided with a transverse discharge opening on each side of said aligned pipes, a hopper structure positioned upon said platform, said hopper structure comprising a pair of hoppers for carrying granules of different characteristics, each hopper being provided with a flow opening, said hopper structure being movable upon said platform to bring alternately the flow openings of said pair of hoppers into respective communication with the upper ends of said pipes and a discharge opening, a valve plate movably positioned in each discharge opening for opening and closing communication between an adjacent discharge opening and an adjacent flow opening, means for moving said valve plate to opened and closed position, applicator means disposed beneath the lower mouths of said pipes for applying granules from said pipes to a passing web, discharge means beneath each discharge opening for receiving granules from the companion flow opening when said valve plate permits communication between said companion flow opening and a discharge opening, and partition means carried in a hopper in substantial planar alignment with the lateral abutting walls of an adjacent pair of pipes.

References Cited in the file of this patent

UNITED STATES PATENTS

| | | |
|---|---|---|
| 1,872,622 | Donahue | Aug. 16, 1932 |
| 1,906,471 | Lambacher | May 2, 1933 |
| 2,011,006 | Maclean | Aug. 13, 1935 |
| 2,460,605 | Soissa | Feb. 1, 1949 |